United States Patent [19]

Michaelis

[11] 4,365,324
[45] Dec. 21, 1982

[54] ECCENTRICITY CONTROL DEVICE
[75] Inventor: Theodore D. Michaelis, Marlton, N.J.
[73] Assignee: RCA Corporation, New York, N.Y.
[21] Appl. No.: 208,439
[22] Filed: Nov. 19, 1980
[51] Int. Cl.³ .................. G11B 21/10; G11B 7/00
[52] U.S. Cl. ........................ 369/44; 360/77; 250/202; 318/577
[58] Field of Search .......... 369/44, 43, 111, 220; 358/128.5, 128.6; 360/77; 250/202, 203, 201, 570; 318/577, 314, 592

[56] References Cited

U.S. PATENT DOCUMENTS

| | | | |
|---|---|---|---|
| 3,876,827 | 4/1975 | Janssen | 369/43 |
| 4,067,044 | 1/1978 | Maeda | 369/44 |
| 4,138,741 | 2/1979 | Hedlund | 360/77 |
| 4,160,270 | 7/1979 | Goldschmidt | 360/77 |
| 4,222,071 | 9/1980 | Bell | 346/76 L |

*Primary Examiner*—Alan Faber
*Attorney, Agent, or Firm*—E. M. Whitacre; J. S. Tripoli; J. E. Roehling

[57] ABSTRACT

Eccentricity control apparatus is provided in a system for optically recording and reading information on a rotating disc medium. The information may be recorded on concentric or spiral tracks. The eccentricity control apparatus includes a detector for detecting track crossings as an optical scanning head scans the disc surface. The detector provides pulses representative of track crossings. The number of pulses in a once-around is representative of the amplitude of an eccentricity control signal. The angle measured between a once-around pulse and a minimum pulse rate of the track crossings indicates the phase of the error. An eccentricity error signal which is generated by suitable circuitry is applied to affect the manner in which the optical scanning head scans the disc surface such that number of track crossings is reduced.

7 Claims, 5 Drawing Figures

ECCENTRICITY CONTROL DEVICE

This invention relates generally to record and playback systems used with disc, drums or similar rotating surfaces and, more particularly, to systems equipped to lock onto and follow a track on a rotating surface by moving a transducer means relative to the surface.

Prior art information storage systems utilize magnetic and optical recording tracks on tape, disc and drum surfaces. The packing density, which is inversely proportional to the track spacing, has been significantly increased in optical systems utilizing a laser as an optical transducer. Generally, known systems do not provide satisfactory non-continuous recording when the track spacing is very close because of the difficulty involved in precisely relocating the transducer after it has been moved with respect to the recording surface. Several problems relating to non-continuous recording systems and track following in playback systems have heretofore remained without satisfactory solutions. One such problem is the mechanical positioning of the medium after removal and remounting for recording subsequent tracks. Another problem is caused by the eccentricity errors of the surface resulting from distortion and deformation of the surface structure by, inter alia, thermal effects. The eccentricity alters the track position profiles of previously recorded tracks and causes track deviations that may exceed the capability of a closed loop automatic tracking servo system. As a result, in a recording system a new track might overlay a previously recorded track and the information recorded thereon may be lost. Further, in a playback system the eccentricity of the previously recorded tracks may exceed the servo capability to sufficiently correct it, thus making it difficult, if not impossible, to retrieve the prerecorded information.

In accordance with the principles of the present invention, a system for automatically measuring the eccentricity of a record medium and injecting an appropriate compensating signal is provided to deflect the transducer means to more nearly follow the recorded tracks before acquisition by the closed loop servo.

Further, in accordance with the principles of the present invention, the bandwidth requirement for the closed-loop servo system may be reduced thus reducing the noise component and improving the signal-to-noise ratio of the system.

In accordance with another feature of the present invention, record media of large dimensional tolerance may be used. For example, in an optical video disc system, a disc manufactured from a plastic material which is subject to large dimensional variations may be used.

According to one aspect of the present invention an information record and playback system for use in recording and playback of a record medium having information stored along successive, elongated tracks on a surface of the record medium includes an eccentricity control apparatus. The apparatus comprises means for supporting the record medium and means for detecting variations in a given parameter on the surface of the record medium. In the system, relative motion is established between the supporting means and the detecting means such that the detecting means initially scans the record medium surface in a first predetermined fashion. The variations detected by the detecting means are representative of the detecting means sensing the successive, elongated tracks as the detecting means scans across the record medium surface. Further, the apparatus includes means for counting the variations and means for generating pulses. The number of variations counted by the counting means between first and second pulses (e.g., in the case of a disc-shaped record medium, the pulse spacing would be representative of the once-around period of the disc) generated by the generating means are representative of the eccentricity of the detecting means with respect to the record medium surface as the detecting means scans the surface during the relative motion. An error signal generated in accordance with the output of the counting means, which is provided by means for generating an error signal, modifies the relative motion between the supporting means and the detecting means to affect the manner in which the detecting means scans the record medium surface such that the eccentricity of the detecting means with respect to the record medium is reduced.

In accordance with another aspect of the present invention the eccentricity control apparatus is provided with a second means for detecting a positional deviation between a first position of the supporting means corresponding to the position of the supporting means when the first pulse is generated by the pulse generating means and a second position of the supporting means corresponding to the position of the supporting means when a first frequency rate of variations is counted by the counting means. In accordance with this aspect, a means for adjusting the error signal generating means is provided to vary the phase of the error signal in response to the output of the second detecting means.

Other features and advantages of the present invention will be more fully understood from the following detailed description of the preferred embodiment, the appended claims, and the accompanying drawing, in which:

As will be illustrated by the embodiment to be described, the invention provides for a means for storing and retrieving, in a high density environment, information or data that can be located for rapid, random access at any time following recordation. Although the principles of the present invention are described and illustrated in their application to a disc record and playback system by which data is processed on a real time basis, it is noted that they also apply to other forms and shapes of rotating recording media such as drums, cylinders and the like. Furthermore, while the preferred embodiment of the invention is explained and illustrated as a recording system for recording digital data type signals, the principles of the invention are equally applicable to other forms of encoded data such as audio, video, audio plus video and X-ray. Furthermore, the encoding scheme in which the signals are recorded on the record medium is a matter of choice.

Figure 1:
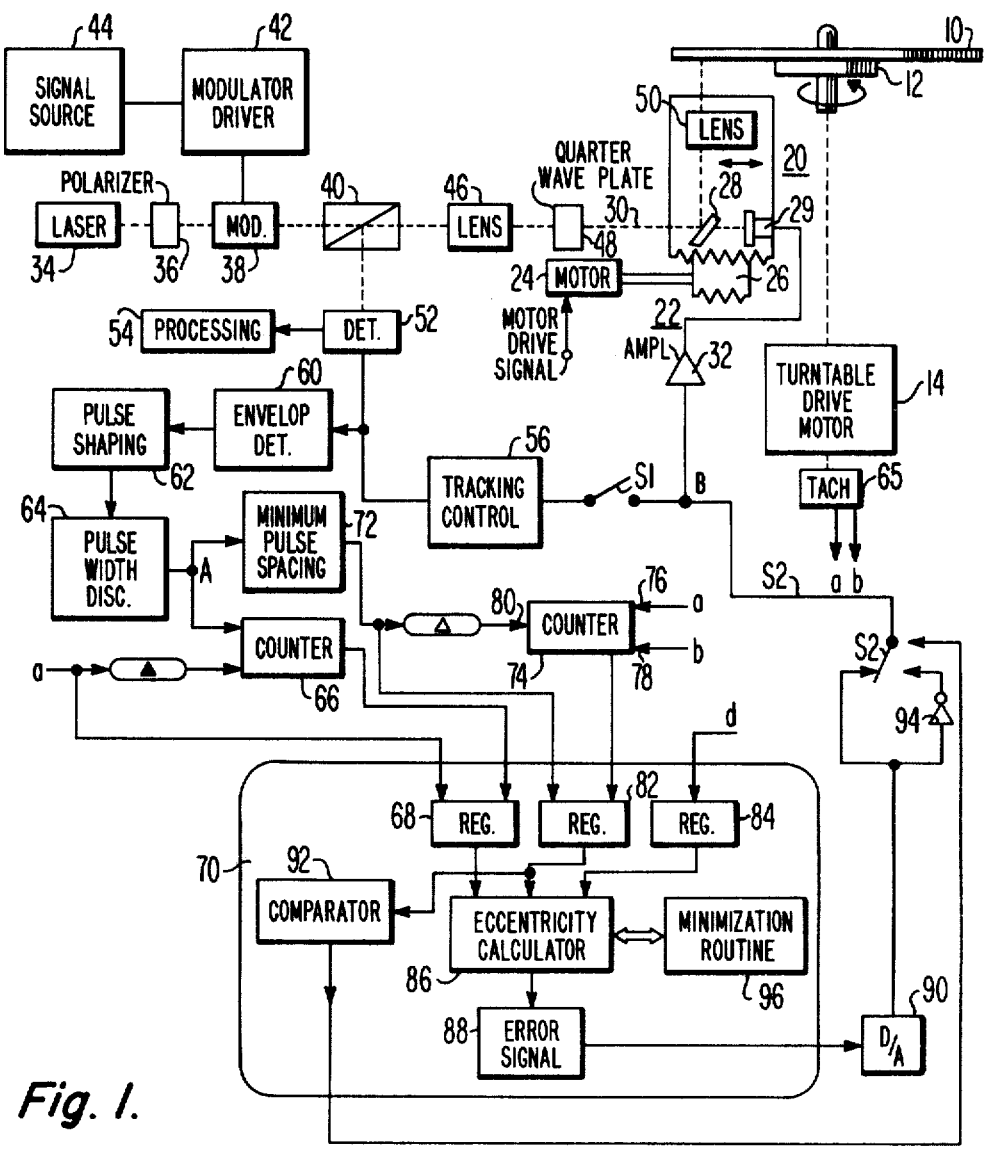
FIG. 1 shows, via a block diagram representation, a recording and playback system embodying the principles of the present invention.

In accordance with the embodiment of FIG. 1, data are stored on precisely located tracks for rapid retrieval. Recordation is achieved on a light sensitive disc into which data are permanently recorded generally by ablation or melting. The recorded information is available immediately without further processing of any kind.

A disc 10 as illustrated in FIG. 1 is formed having a laser sensitive material providing a surface upon which ablative recording by the thermal effects of a focused laser beam may be made. In the embodiment described herein, the surface should be non-reflective for best results. A preferred disc for ablative recording is disclosed in U.S. Pat. No. 4,222,071 issued on Sept. 9, 1980 to A. E. Bell, et al. Disc 10 may be provided with either or both of two track formats. One format comprises concentric circular tracks while the other format comprises a spiral track having successive, spaced-apart track convolutions. In both formats adjacent, tracks are closely spaced (e.g., 2.5 microns).

To provide optical scanning on the surface of disc 10, optical stage 20 is kept stationary (i.e., for the concentric format) or moved radially (i.e., for the spiral format) across disc 10 by transporting means 22 at a rate in accordance with the requirements of the desired recording or playback mode while disc 10 is rotated on turntable 12 by motor 14. Transporting means 22 comprises conventional components including coarse tracking motor 24 and a feedscrew 26 to be rotated in response to rotations of the shaft of motor 24. Feedscrew 26 is in mesh engagement with a bearing surface of stage 20. When motor 24 is activated and the shaft is rotated, for example, in a clockwise direction, feedscrew 26 will cause stage 20 to move radially inward toward the center axis of turntable 12. Furthermore, if the shaft motor 24 is made to rotate in a counter-clockwise direction, stage 20 will move radially outward. Stage 20 is moved at several different rates of speed during various modes of operation. By means of a motor drive signal which is described in U.S. Pat. No. 4,138,741 issued on Feb. 6, 1979 to L. V. Hedlund, et al., stage 20 may be moved (i.e., coarse tracking movements) such that light beam 30 falls on the surface of disc 10 to within a few tracks of a desired track location. Fine tracking movements may be achieved by deflecting the light beam exactly to a desired track by a conventional galvanometer controlled mirror 28 which is included within optical stage 20. Galvanometer 29 causes galvanometer controlled mirror 28 to move about an axis that is parallel to the surface of mirror 28 for deflecting impinging light beam 30 onto the surface of disc 10 so that a light spot that is formed by lens 50 may be guided or tracked along a selected path on disc 10. Mirror 28 is actuated by galvanometer 29 in response to control signals from amplifier 32. The control signals which are supplied by amplifier 32 will be described in greater detail herein.

In the record mode, the monochromatic light output of laser 34 (illustratively an argon type providing an output wavelength of 488 nanometers) is passed via polarizer 36 and intensity modulator 38 to a polarized beam splitter 40. The polarizer 36 effects a polarization of the laser output in a direction that permits passage of the intensity modulated light through the beam splitter 40. The intensity modulator 38 is driven by a modulator driver 42, responsive to a data stream source of digital information. The data stream source, which may be pulse code modulated, is furnished by signal source 44 to modulator driver 42. The light intensity of the output of modulator 38 is shifted between high and low levels in consonance with the pulse code modulated input signal.

A lens 46 forms the light passed by beam splitter 40 into a beam which passes through quarter wave plate 48 to galvanometer controlled mirror 28 which reflects the beam through a focusing lens 50 onto the absorptive surface layer of disc 10. The absorptive layer in the path of the focused light beam causes a pit to be formed through the ablative process when the light beam intensity level is high, while the absorptive layer remains undisturbed when the light beam intensity level is low. The result is formation of an information track of the general type shown in the aforementioned Bell et al. patent.

In the play mode of operation, variations of the intensity of the laser output is discontinued by a suitable disabling of modulation control system 38, 42 and 44. The intensity of the laser output is set at a constant playback level which is safely below the level causing ablation of the material of the absorptive layer. The laser beam follows the previously described path (via elements 36, 38, 40, 46, 48 and 28) to lens 50 which focuses the beam on the desired information track of disc 10. Light reflected from the information track is returned via elements 50, 28, 48 and 46 to the beam splitter 40. Since the return light beam has made two passes through quarter wave plate 48, its polarization has been altered to a direction which results in reflection of the return light beam by beam splitter 40 onto photodetector 52.

The intensity of light falling upon the photodetector 52 alternates between minimum and maximum levels as the successive pit and undisturbed surface regions of the information track pass through the path of the focus beam. The minimum intensity level for light reaching photodetector 52 is obtained when an undisturbed region of the absorptive layer of disc 10 is in the focus beam path, while the maximum intensity level for light reaching the photodetector 52 is obtained when a pit is in the focused beam path.

The output of the photodetector comprises pulse code modulated waves which vary in consonance with the pit edge spacing. Variations of the detected beam intensity are representative of the original signal encoded on the disc surface during the recording operation. The photodetector output is applied to processing circuitry 54 for use in suitable processing equipment.

To compensate for eccentricity errors of the read or record light beam on the disc surface two eccentricity error signals are provided to amplifier 32 from summing point B. The first of these error signals is furnished from tracking control circuitry 56. The tracking control 56 provides a closed loop servo system for maintaining, in the read mode, a reading light beam on a particular track which is being read. Tracking control 56 may comprise a dither signal processor and error signal generator as described in U.S. Pat. No. 4,160,270 issued on July 3, 1979 to A. M. Goldschmidt et al. If the bandwidth of the tracking control circuitry 56 is too great, for example, providing eccentricity control of ±15 tracks, excessive noise may appear in the pickup circuitry because the servo is unable to lock onto a single track. In accordance with the present invention, an open loop eccentricity control system is described for automatically measuring the eccentricity and providing an appropriate error signal to summing point B which causes the light beam deflector (i.e., galvanometer controlled mirror 28) to direct light beam 30 to more nearly follow the tracks already recorded on disc 10. Accordingly a compensation signal is injected at point B before acquisition of the closed loop servo is commanded, thus ensuring lockon. The signal from tracking control circuitry 56 is thus switched into the feedback loop by switch S1 when acquisition is desired.

The operation of the open loop eccentricity control circuitry will now be described. As the disc is rotated by turntable drive motor 14, traversal (in the radial direction) of a single track by light beam 30 produces a sequential condition of the low light reflectance to high light reflectance (i.e., on track) to low light reflectance again. Thus a pulse is produced for each traversal of a signal track. One of the theories of the present invention is that the amplitude of the eccentricity of the transducer with respect to the disc can be measured by the number of pulses in a once-around revolution of the disc.

Referring again to FIG. 1 light detector 52 converts the impinging light beam into an electrical signal that is coupled to an envelope detector 60 and a pulse shaping circuit 62. The output of the pulse shaping circuit is coupled to pulse width discriminator 64. Pulse width discriminator 64 is provided to prevent narrow pulses, which may be representative of dust, scratches, or information bits from being counted as radial track crossings or traversals. Circuitry suitable for use as a pulse width discriminator will be described herein with reference to FIGS. 2 and 3.

The pulse output at point A should be representative of light beam 30 traversing an information track recorded on the surface of disc 10 as it is rotated. To determine the eccentricity error two parameters are needed—amplitude and phase. Tachometer 65, coupled to turntable drive motor 14, provides pulses "a" every time turntable 12 turns 360° (i.e., once-around pulses) and pulses "b" which are fixed in spatial frequency and correspond to the turntable position at any particular time. Pulses b are chosen to be of a fairly high frequency rate (e.g., 360 pulses per once-around). Counter 66 is coupled to the output of pulse width discriminator 64. In operation the number of track crossings are counted in counter 66 during the interval between once-around pulses a. The number of track crossings counted in counter 66 provides the amplitude information for the eccentricity calculation. This information is stored in register 68 of microcomputer 70.

Minimum pulse spacing detector 72 is also coupled to the output of pulse width discriminator 64. Minimum pulse spacing detector 72 provides information with respect to the phase of the eccentricity control signal. Circuitry which is suitable for use as a minimum pulse spacing detector will be described herein with reference to FIGS. 4 and 5. The purpose of the minimum pulse spacing detector is to detect the condition when the spacing between track crossing pulses is at a minimum. Counter 74 has three inputs: an enabling input 76 which is coupled to the once-around pulse output from tachometer 65, a clock input 78 which is coupled to the high frequency output b of tachometer 65 and a reset input 80 which is coupled to the minimum pulse spacing detector 72. In operation, counter 74 starts when a once-around pulse a is delivered to input 76 and counts the high frequency pulses from tachometer 65 at clock input 78 until it receives a reset input from the minimum pulse spacing detector 72 at input 80. When the minimum pulse spacing detector pulse is delivered to counter 74 the contents of the counter are transferred to register 82 in microcomputer 70. Register 82, therefore, contains information with respect to the phase of the eccentricity control necessary to compensate for the eccentricity of disc 10 as it rotates on turntable 12.

A third register 84 is provided in microcomputer 70 for storing information with respect to the track spacing (illustratively, 2.5 μm) previously recorded on disc 10. This information may be inserted by the operator of the optical disc system.

In microcomputer 70 an eccentricity calculation is performed in eccentricity calculator 86. The eccentricity $\epsilon$ which is the distance between the center of rotation of turntable 12 and the center of a set of circular (of course, the center of a spiral track will also apply) tracks recorded on disc 10 may be represented by the formula:

$$\epsilon = dN/4,$$

where N represents the number of track crossings per revolution and d represents the distance between tracks. The phase of the eccentricity is determined by measuring the angle from the once-around pulse to the point where the pulse rate (i.e., representative of track crossings) is a minimum (of course, a count could be made to a maximum pulse rate). The output from counter 74 represents the number of high frequency pulses from tachometer 65 included in the interval from the once-around event to the minimum pulse spacing event. The phase angle $\theta$ is equal to:

$$\theta = 2\pi M/T,$$

where M represents the number of pulses measured from the once-around point to the point of minimum pulse rate and T represents the number of pulses in a once-around of tachometer 65.

An eccentricity function (e.g., a sine wave) may be stored in memory in microcomputer 70. An error signal generator 88 may employ a binary incremental encoder, typically 1024 counts per revolution, which is counted out during a revolution of the disc. The amplitude $\epsilon$ and phase $\theta$ modify the error signal generator 88 such that the illustrative sinusoidal eccentricity function compensates for the disc eccentricity. The digital output from error signal generator 88 is converted to an analog signal by the digital-to-analog converter 90. Digital-to-analog converter 90 is coupled to amplifier 32 to modify the pattern that light beam 30 scans on the surface of disc 10, thus compensating for disc eccentricity.

The phase of the error signal contains an inherent 180° ambiguity. Comparator 92 coupled to register 68 is provided to compensate for any ambiguity. After a first sample the count N1 is stored in comparator 92. After an error signal is applied to amplifier 32 a new count N2 is delivered to comparator 92. If the count N2 is greater than the count N1 the error signal is 180° out-of-phase and phase is corrected by changing the position of switch S2. Thus if the error signal from digital-to-analog converter 90 did not originally pass through inverter 94 after switch S2 is flipped error signal will pass therethrough.

If after compensation the count exceeds some small threshold (typically an eccentricity of three or four tracks) the amplitude and phase corrections may be sequentially trimmed by a trial and error subroutine to minimize the count. A minimization routine 96 coupled to eccentricity calculator 86 may be included in microcomputer 70 to reduce the count from counter 66 even below an eccentricity of three or four tracks.

After compensation is complete the closed loop servo switch S1 may be closed. Closure of switch S1 initiates the operation of tracking control 56 to maintain light beam 30 on the track of interest.

Figure 2:
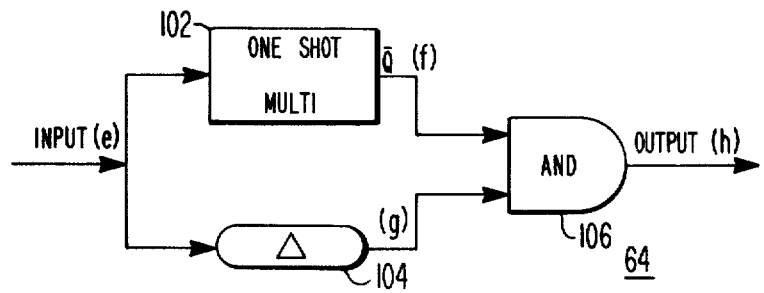
FIG. 2 is a schematic diagram of an embodiment of the minimum pulse with discriminator of FIG. 1.
Figure 3:
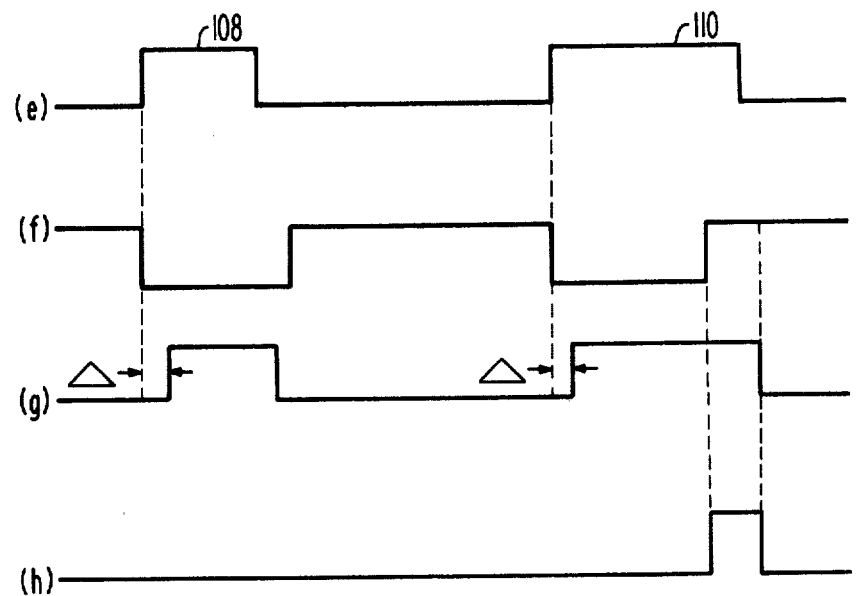
FIG. 3 shows a timing diagram for the pulse width discriminator of FIG. 2.

Referring now to FIGS. 2 and 3, operation of the pulse width discriminator 64 of FIG. 1 will be described. An input pulse triggers multivibrator 102 and simultaneously is passed through delay 104 to one input of AND gate 106. The other input to AND gate 106 is provided from the Q output of the one shot multivibrator 102. As arranged the output from AND gate 106 will, therefore, be high only when the input pulse is greater in duration than the output pulse from the Q output of one shot multivibrator 102. FIG. 3 shows a timing diagram for the operation of pulse width discriminator 64 of FIG. 2. Waveform e represents the input signal to pulse width discriminator 64 and is shown with two pulses 108 and 110 which are of different time durations. Waveform f represents the Q output of one shot multivibrator 102. Illustratively, the pulse width of the one shot multivibrator is chosen to be 50 microseconds long which represent the minimum time duration of the pulse width discriminator. Waveform g represents the delayed output from delay 104. The delay (illustratively, one microsecond) of input e is provided to keep AND gate 106 from triggering on the leading edge of pulse 108 or 110. Waveform h represents the output from AND gate 106. As shown in FIG. 3, the output of AND gate 106 is high only during the interval when the input pulse overlaps the one shot output. The purpose of this circuit is to prevent narrow pulses (illustratively, less than 50 microseconds) which may be caused by dust, scratches or information bits from being counted erroneously as track crossings.

Figure 4:
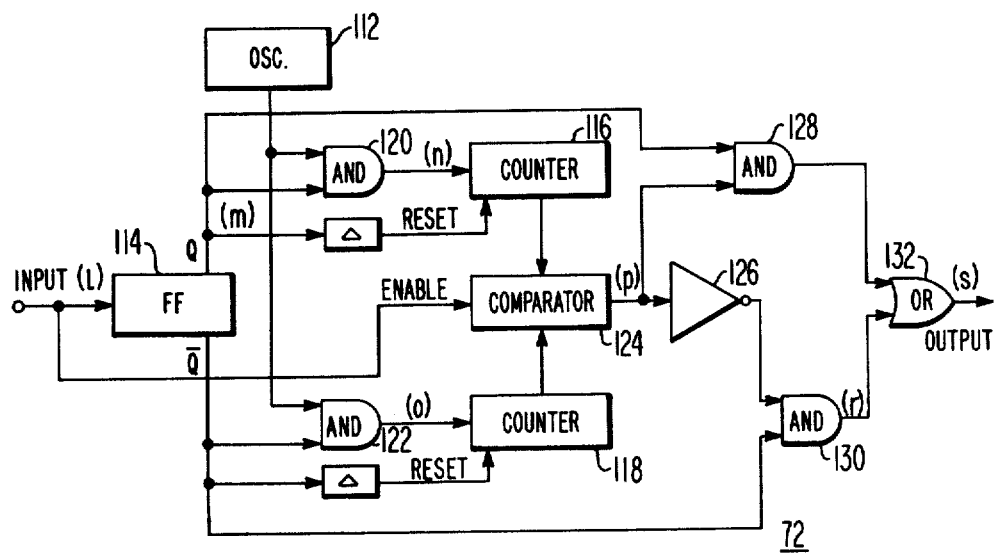
FIG. 4 is a schematic diagram of an embodiment of the minimum pulse spacing detector of FIG. 1.
Figure 5:
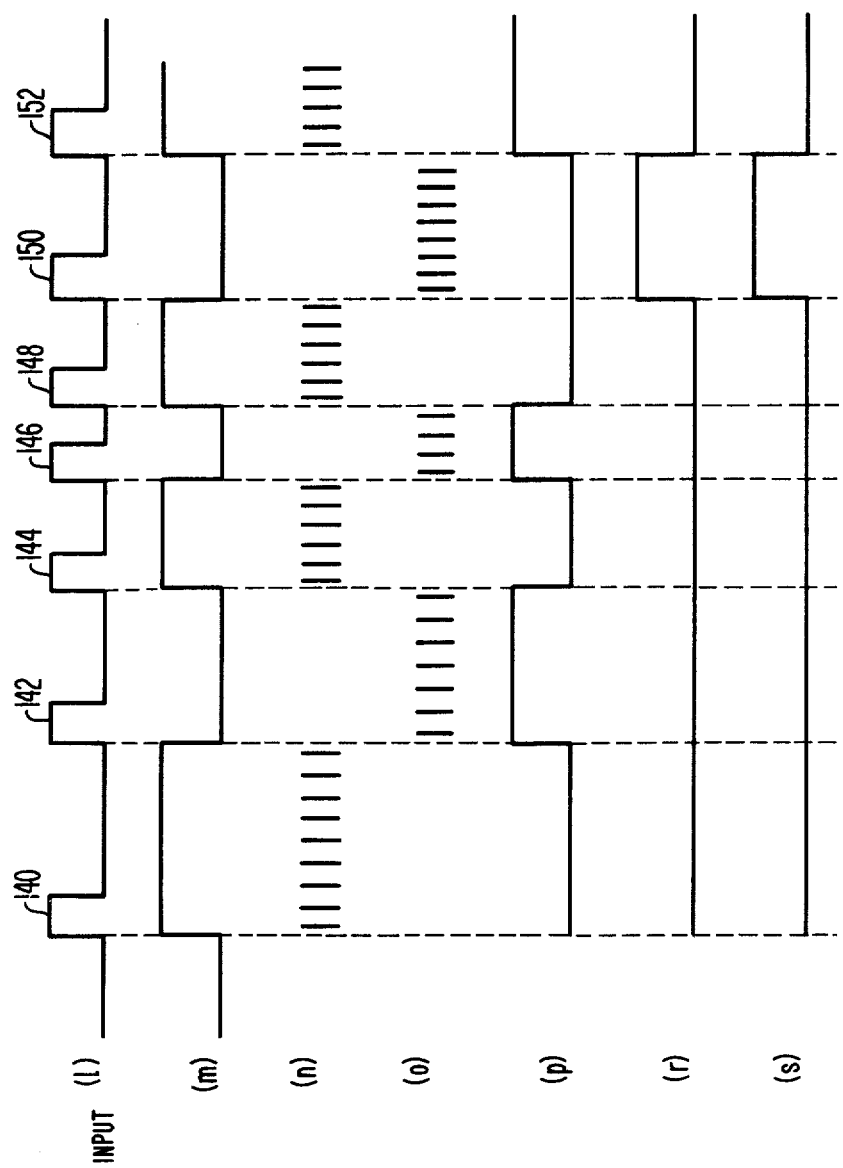
FIG. 5 shows a timing diagram of the minimum pulse spacing detector of FIG. 4.

Referring to FIGS. 4 and 5, suitable circuitry for the minimum pulse spacing detector 72 of FIG. 1 will be described. Oscillator 112 provides a source of pulses to be counted. Illustratively, oscillator 112 may provide pulses typically at a rate of 100 times the rate of the minimum pulse spacing. Input pulses from pulse width discriminator 64 of FIG. 1 are provided to flip-flop 114 to alternately gate counters 116 and 118 with the output pulses from AND gates 120 and 122 respectively. At the end of a gate period comparator 124 is enabled to make a comparison betwen the information on the new counter versus the information which was previously counted. In this embodiment comparator 124 subtracts the count provided by counter 118 from the count provided by counter 116. The output of comparator 124 is high if the count in counter 118 is greater than the count in counter 116 and low if counter 118 is less than counter 116. Inverter 126, AND gates 128 and 130 and OR gate 132 preserve the correct sense to provide an output pulse from OR gate 132 indicative of minimum pulse spacing event.

Referring to the timing diagram of FIG. 5 the operation of the minimum pulse spacing detector 72 will be described. A typical input pulse train is shown as waveform 1 having pulses 140, 142, 144, 146, 148, 150, 152. The pulse spacing between pulses 146 and 148 represents the minimum pulse spacing in the input train 1. Pulse train m represents the Q output from flip-flop 114. Pulse trains n and o represent the output from AND gates 120 and 122 respectively. Waveform p represents the output from comparator 124; as can be seen it remains in a low state when the new count from counter 116 is greater than the old count from counter 118 at the initiation of pulse 150. Waveform r represents the output from AND gate 130 and waveform s represents the output from OR gate 132.

From FIGS. 4 and 5, it can be seen that at the initiation of pulse 150 comparator 124 which was comparing alternately decreasing counts from counters 116 and 118 now detects an increase in the counter sequence. The new count from counter 116 on initiation of pulse 150 is greater than the old count from counter 118. At this point the output from comparator 124 remains low, thus the input from comparator 124 to AND gate 130 is high and the Q input from flip-flop 114 to AND 130 is high making the output of AND gate 130 high, thus the output from OR gate 132 high. The high output from OR gate 132 signals the minimum pulse spacing event.

While the principles of the present invention have been demonstrated with particular regard to the illustrative structures of FIGS. 1–5, it will be recognized by those of skill in the art that various departures from such illustrative structures may be undertaken in practice of the invention. For example, although the eccentricity control apparatus of the present invention is applied to eccentricity errors its extension to harmonic errors is also applicable.

What is claimed is:

1. In an information recording and playback system for use with a record medium having information stored along successive, elongated tracks on a surface thereof, an apparatus comprising:

means for supporting said record medium;

means for detecting variations in a given parameter on said surface of said record medium;

means for establishing relative motion between said supporting means and said detecting means such that said detecting means initially scans said record medium surface in a first predetermined manner;

means for counting variations in said given parameter detected by said detecting means, said variations being representative of said detecting means sensing said successive tracks as said detecting means scans across said successive tracks;

means for generating pulses responsive to the relative motion established between said supporting means and said detecting means;

the number of variations counted by said counting means between first and second pulses generated by said generating means being representative of the eccentricity of said detecting means with respect to said record medium as said detecting means scans the surface of said record medium;

means responsive to said counting means, for generating an error signal; said error signal being applied to said means for establishing relative motion to affect the manner in which said detecting means scans said record medium surface, whereby said error signal affects said means for establishing relative motion such that the eccentricity of said detecting means with respect to said record medium is reduced;

second means for detecting a positional deviation between a first position of said supporting means corresponding to the position of said supporting means when said first pulse is generated by said pulse generating means and a second position of said supporting means corresponding to the position of said supporting means when a first frequency rate of variations is detected by said detecting means;

means for adjusting said error signal generating means to vary the phase of said error signal in response to said second detecting means;

means for inverting the polarity of the error signal being generated by said error signal generating means; and means for switchably connecting said inverting means in a signal path connecting said means for generating an error signal to said means for establishing relative motion.

2. The apparatus according to claim 1 further comprising:

second means for generating a second eccentricity error signal; and means for switchably connecting said second means for generating a second eccentricity error signal to said means for establishing relative motion.

3. In an information playback system for use in a playback of a disc-shaped record medium having information stored along successive, elongated tracks on a surface of said record medium, an apparatus comprising:

turntable means for supporting and rotating said disc-shaped record medium;

means for producing a focused beam of light incident on said surface of said disc-shaped record medium;

means for establishing relative motion between said focused beam of light and said turntable means;

means for providing a signal having first pulses representative of said focused beam of light traversing said successive, elongated tracks as said turntable means rotates;

means for providing a signal having second pulses synchronized with said turntable rotational rate;

means for counting said first pulses during the interval between a pair of second pulses;

means for providing an error signal to said means for establishing relative motion to vary the relative motion between said focused beam of light and said turntable means in response to the number of first pulses counted by said counting means;

means for determining a positional deviation between a first position of said turntable means corresponding to the position of said turntable means when a given second pulse is provided by said means for providing a signal having second pulses and a second position of said turntable means corresponding to the position of said turntable means when a first frequency rate of said first pulses is provided by said means for providing a signal having first pulses; and means for adjusting said means for providing an error signal to vary the phase of said error signal in response to said means for determining a positional deviation.

4. The apparatus according to claim 3 further comprising:

means for inverting the polarity of the error signal being generated by said error signal generating means; and means for switchably connecting said inverting means in a signal path connecting said means for generating an error signal to said means for establishing relative motion.

5. The apparatus according to claim 4 further comprising:

second means for generating a second eccentricity error signal; and means for switchably connecting said second means for generating a second eccentricity error signal to said means for establishing relative motion.

6. In an information retrieval system for use in playback of a disc-shaped record medium having information stored along successive, elongated tracks on a surface of said record medium, an apparatus comprising:

a turntable for supporting and rotating said record medium;

means, coupled to said turntable, for providing pulses representative of the angular position of said turntable;

light source means for providing a focused beam of light incident on said surface of said record medium;

means for establishing radial relative motion between said focused beam of light and said turntable;

means for detecting variations of a given parameter of said beam of light on said surface of said record medium representative of said focused beam of light traversing said successive, elongated tracks;

first means for counting occurrences of said variations sensed by said detecting means, said first counting means being enabled to count said variations during the interval between first and second pulses from said pulse providing means;

means for determining a particular spacing event between occurrences of variations sensed by said means for detecting variations and for providing a signal indicative of said particular spacing event;

second means, responsive to said means for determining a particular spacing, for counting pulses provided by said means for providing pulses, said pulse counting means being enabled to count pulses during the interval between said first pulse from said pulse providing means and said signal from said means determining a particular spacing event;

means responsive to said first counting means and said second counting means, for generating an error signal to adjust said means for establishing radial relative motion such that said focused beam of light traces a path on the surface of said record medium which substantially follows a path of one of said successive, elongated tracks; and means for inverting the polarity of said error signal.

7. The apparatus according to claim 6 further comprising:

second means for generating a second eccentricity error signal; and means for switchably connecting said second means for generating a second error signal to said means for establishing relative motion.

\* \* \* \* \*